US012450557B2

(12) United States Patent
Gopalswamy et al.

(10) Patent No.: US 12,450,557 B2
(45) Date of Patent: Oct. 21, 2025

(54) SYSTEMS AND METHODS FOR SUPPLY CHAIN MANAGEMENT

(71) Applicant: Walmart Apollo, LLC, Bentonville, AR (US)

(72) Inventors: Karthick Gopalswamy, Sunnyvale, CA (US); Jayadeep Anil Shitole, San Jose, CA (US); Ajinkya Ajay More, Santa Clara, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 350 days.

(21) Appl. No.: 17/871,732

(22) Filed: Jul. 22, 2022

(65) Prior Publication Data
US 2023/0045667 A1 Feb. 9, 2023

Related U.S. Application Data

(60) Provisional application No. 63/225,296, filed on Jul. 23, 2021.

(51) Int. Cl.
*G06Q 10/087* (2023.01)
*G06F 18/23* (2023.01)
*G06Q 30/0202* (2023.01)

(52) U.S. Cl.
CPC .......... *G06Q 10/087* (2013.01); *G06F 18/23* (2023.01); *G06Q 30/0202* (2013.01)

(58) Field of Classification Search
CPC ... G06Q 10/087; G06Q 30/0202; G06F 18/23
See application file for complete search history.

(56) References Cited

U.S. PATENT DOCUMENTS 8,812,338 B2 8/2014 Pratt
2007/0129992 A1 6/2007 Kasper et al.
(Continued)

OTHER PUBLICATIONS

Hoskins, M., et al., "The PrePack Optimisation Problem," International Conference on Integration of Constraint Programming, Artificial Intelligence and Operations Research, found at https://www.researchgate.net/publication/267472381 (9 pgs) May 2014.
(Continued)

*Primary Examiner* — Ariel J Yu
*Assistant Examiner* — Denisse Y Ortiz Roman
(74) *Attorney, Agent, or Firm* — FOLEY & LARDNER LLP (57) ABSTRACT

A systems including one or more processors and one or more non-transitory computer readable media storing computing instructions that, when executed on the one or more processors, perform: receiving inventory information from two or more merchants; clustering the two or more merchants into a group of merchants; operating an optimization model for the subset of the inventory information for the group of merchants to determine a first inventory configuration for each of the two or more merchants at a seller location; operating the optimization model for the subset of the inventory information the group of merchants to determine a second inventory configuration for each of the two or more merchants at the seller location; and combining the first inventory configuration and the second inventory configuration to determine third inventory configuration for each of the two or more merchants at the seller location. Other embodiments are described.

20 Claims, 4 Drawing Sheets

(56) References Cited

U.S. PATENT DOCUMENTS

2012/0179506 A1     7/2012  McMains et al.
2012/0284071 A1   11/2012  Vakhutinsky
2012/0284079 A1*  11/2012  Vakhutinsky .......... G06Q 30/00
2019/0147469 A1*   5/2019  Hu ........................ G06F 16/353
                                                                                          705/7.34

OTHER PUBLICATIONS

Fischetti, M., et al., "Mixed-Integer Linear Programming Heuristics for the Prepack Optimization Problem," Discrete Optimization 22 (2016) pp. 195-205 2016.

* cited by examiner

SYSTEMS AND METHODS FOR SUPPLY CHAIN MANAGEMENT

CROSS-REFERENCE TO RELATED APPLICATION

This is a continuation of Provisional Patent Application Ser. No. 63/225,296, filed on Jul. 23, 2021, which is herein incorporated by this reference in its entirety.

TECHNICAL FIELD

This disclosure relates generally to supply chain management, and more particularly to systems and methods for supply chain management.

BACKGROUND

Prepacks are combinations of different sizes and colors of an item (e.g., apparel) that are packed together to facilitate supply chain management. As the demand for items can vary between different stores, it is a challenge for merchants (e.g., retailers) to accurately fulfil the demand at a store level without creating a large number of prepacks, which may create excess inventory and add to supply chain overhead. To reduce the supply chain costs, merchants desire each of the prepacks to be as densely packed as possible and often attempt to determine optimal prepack configurations and allocation to stores. However, there are often errors in fulfilment at the store level while determining pack configurations that work across different stores and follow particular supplier packing constraints.

BRIEF DESCRIPTION OF THE DRAWINGS

To facilitate further description of the embodiments, the following drawings are provided in which.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and perform: receiving inventory information from two or more merchants; clustering the two or more merchants into a group of merchants based on clustering criteria for a subset of the inventory information for the group of merchants; operating an optimization model for the subset of the inventory information for the group of merchants to determine a first inventory configuration for each of the two or more merchants at a seller location; operating the optimization model for the subset of the inventory information the group of merchants to determine a second inventory configuration for each of the two or more merchants at the seller location; and combining the first inventory configuration and the second inventory configuration to determine third inventory configuration for each of the two or more merchants at the seller location, wherein the third inventory configuration are more optimal than the first or second inventory configurations.

Various embodiments include a method. The method can be implemented via execution of computing instructions configured to run at one or more processors and configured to be stored at non-transitory computer-readable media. The method can comprise receiving inventory information from two or more merchants; clustering the two or more merchants into a group of merchants based on clustering criteria for a subset of the inventory information for the group of merchants; operating an optimization model for the subset of the inventory information for the group of merchants to determine a first inventory configuration for each of the two or more merchants at a seller location; operating the optimization model for the subset of the inventory information the group of merchants to determine a second inventory configuration for each of the two or more merchants at the seller location; and combining the first inventory configuration and the second inventory configuration to determine third inventory configuration for each of the two or more merchants at the seller location, wherein the third inventory configuration are more optimal than the first or second inventory configurations.

Figure 1:
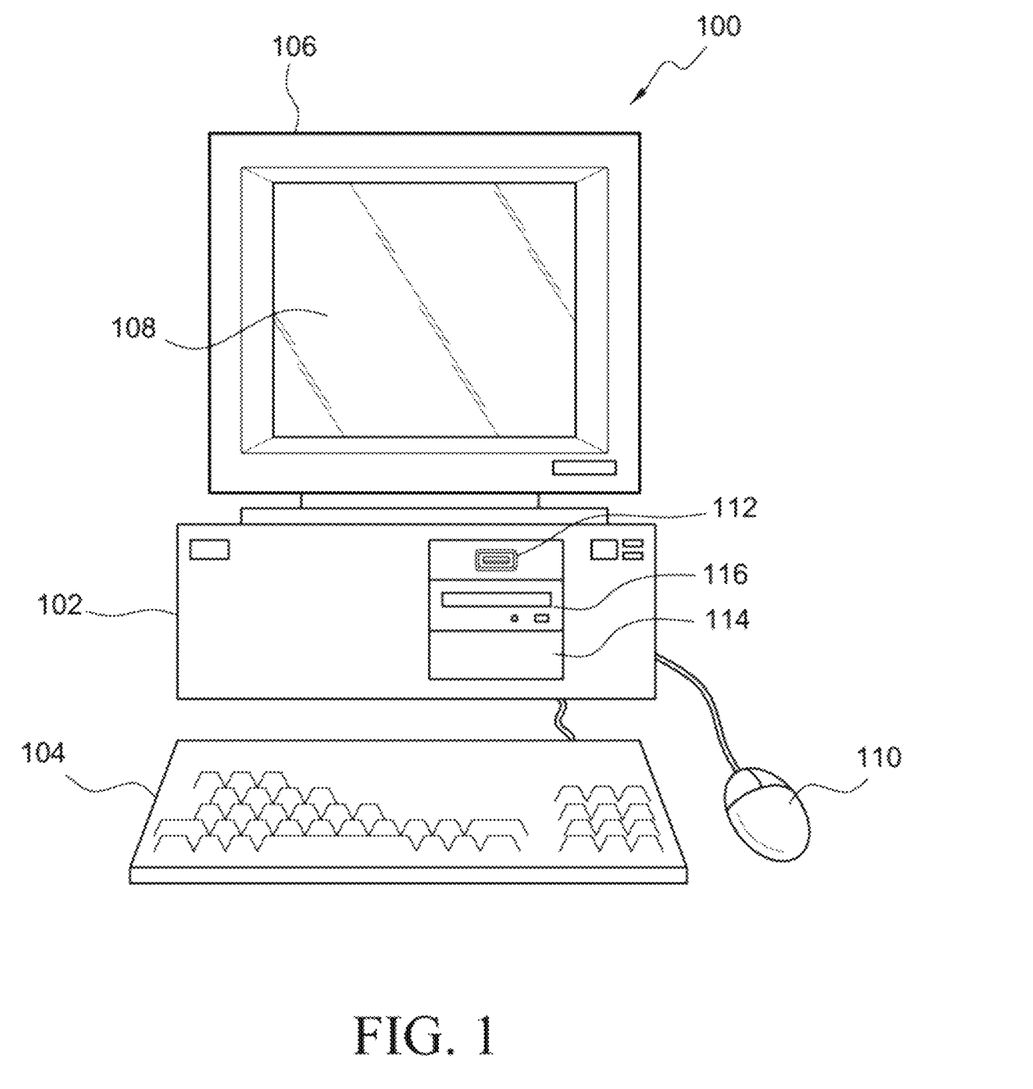
FIG. 1 illustrates a front elevational view of a computer system that is suitable for implementing various embodiments of the systems disclosed in FIG. 3.
Figure 2:
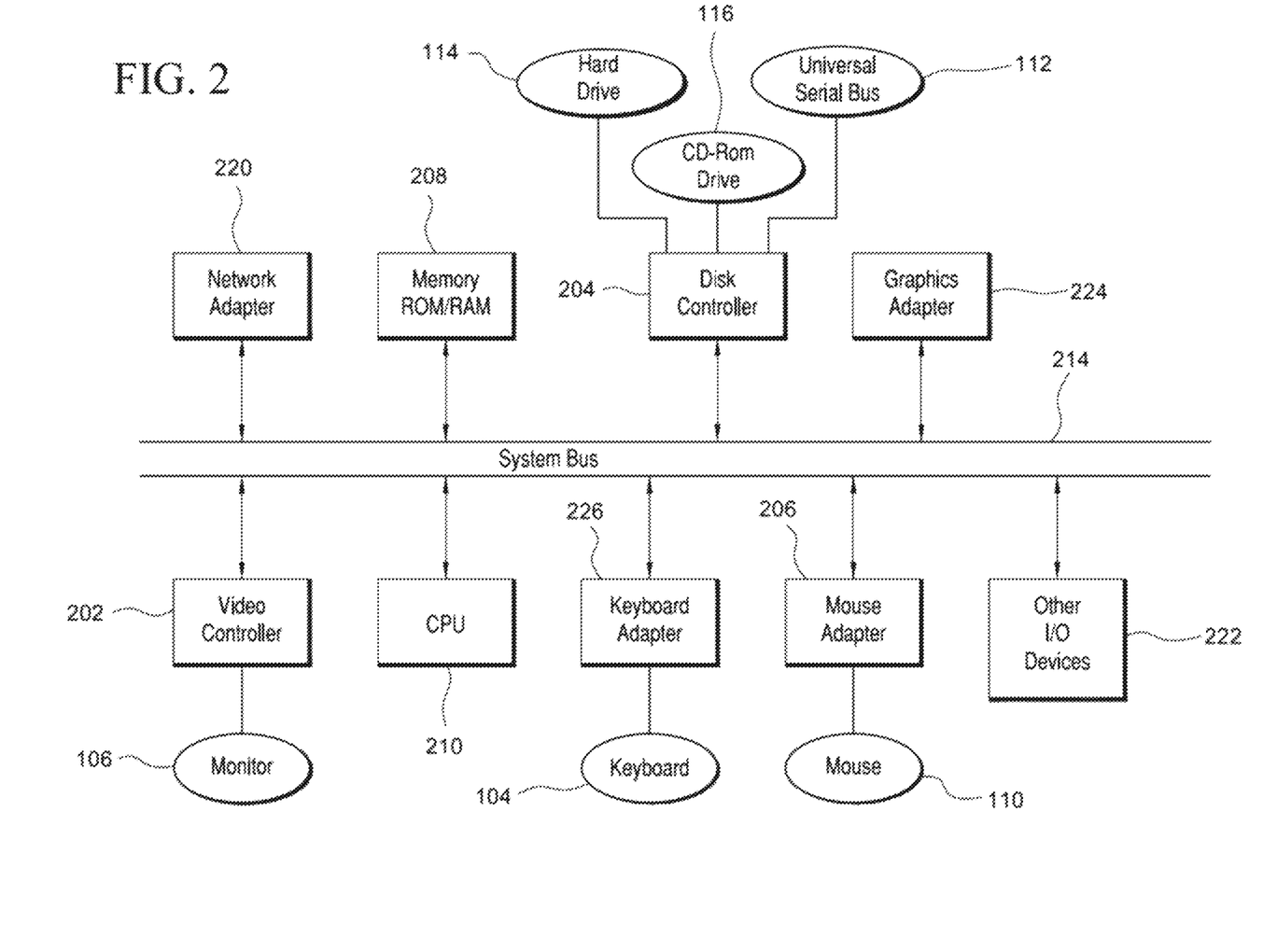
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
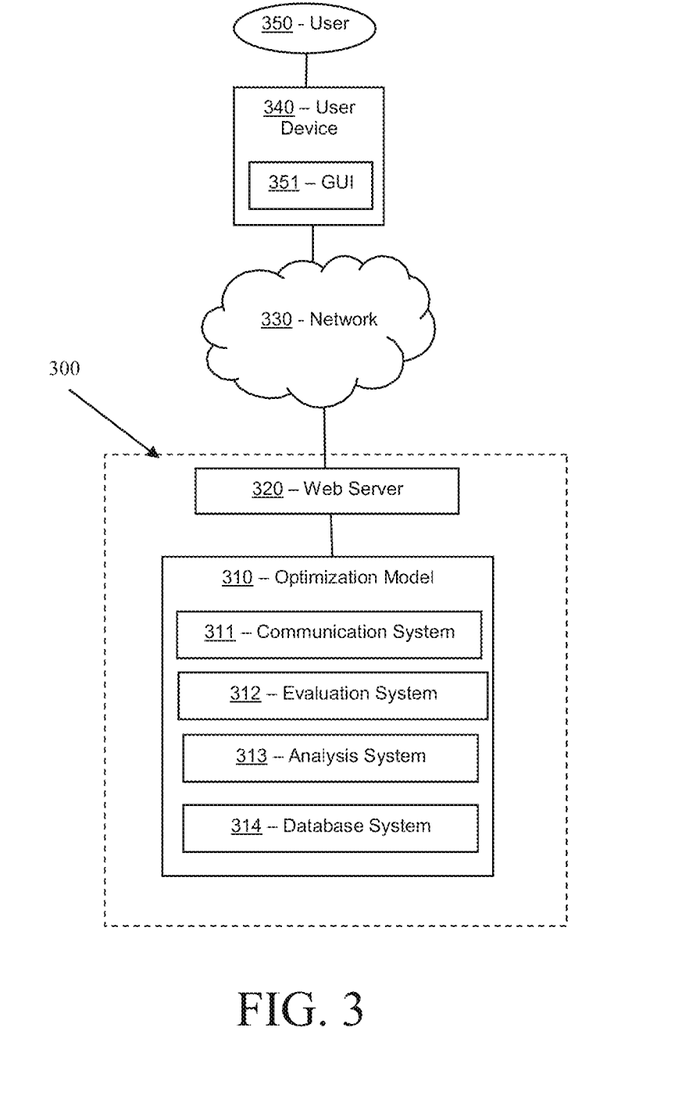
FIG. 3 illustrates a representative block diagram of a system, according to an embodiment.

Turning ahead in the drawings, FIG. 3 illustrates a block diagram of a system 300 that can be employed for performing supply chain management, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. In some embodiments, system 300 can include an optimization model 310 and/or web server 320.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Optimization model 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host optimization model 310 and/or web server 320. Additional details regarding optimization model 310 and/or web server 320 are described herein.

In some embodiments, web server 320 can be in data communication through a network 330 with one or more user devices, such as a user device 340, which also can be part of system 300 in various embodiments. User device 340 can be part of system 300 or external to system 300. In certain embodiments, user device 340 can be a desktop computers, laptop computers, smart phones, tablet devices, and/or other endpoint devices. Network 330 can be the Internet or another suitable network. In some embodiments, user device 340 can be used by users, such as a user 350. In many embodiments, web server 320 can host one or more websites and/or mobile application servers. For example, web server 320 can host a website, or provide a server that interfaces with an application (e.g., a mobile application), on user device 340, which can allow users (e.g., 350) to determine prepack configurations of items, in addition to other suitable activities. In a number of embodiments, web server 320 can interface with optimization model 310 when a user (e.g., 350) is determining configurations of prepacks.

In some embodiments, an internal network that is not open to the public can be used for communications between optimization model 310 and web server 320 within system 300. Accordingly, in some embodiments, optimization model 310 (and/or the software used by such systems) can refer to a back end of system 300 operated by an operator and/or administrator of system 300, and web server 320 (and/or the software used by such systems) can refer to a front end of system 300, and can be accessed and/or used by one or more users, such as user 350, using user device 340. In these or other embodiments, the operator and/or administrator of system 300 can manage system 300, the processor(s) of system 300, and/or the memory storage unit(s) of system 300 using the input device(s) and/or display device(s) of system 300.

In certain embodiments, the user devices (e.g., user device 340) can be desktop computers, laptop computers, mobile devices, and/or other endpoint devices used by one or more users (e.g., user 350). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR1200™ product, the Vuzix Smart Glasses M100™ product, or a similar product by Vuzix Corporation of Rochester, New York, United States of America. In other specific examples, a head mountable wearable user computer device can comprise the Virtual Retinal Display™ product, or similar product by the University of Washington of Seattle, Washington, United States of America. Meanwhile, in further specific examples, a limb mountable wearable user computer device can comprise the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Android™ operating system developed by the Open Handset Alliance, or (iv) the Windows Mobile™ operating system by Microsoft Corp. of Redmond, Washington, United States of America.

In many embodiments, optimization model 310 and/or web server 320 can each include one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to optimization model 310 and/or web server 320 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of optimization model 310 and/or web server 320. In a similar manner, the processors and/or the non-transitory computer-readable media can be local and/or remote to each other.

Meanwhile, in many embodiments, optimization model 310 and/or web server 320 also can be configured to communicate with one or more databases, such as a database system 314. The one or more databases can include geographical information, store-item demand information, supplier constraints, customer choice constraints and/or machine learning training data, for example, among other data as described herein. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database. As explained below, the one or more databases can be part of and/or separate from web server 320 and/or optimization model 310.

Meanwhile, optimization model 310, web server 320, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, optimization model 310 can include a communication system 311, an evaluation system 312, an analysis system 313, and/or database system 314. In many embodiments, the systems of optimization model 310 can be modules of computing instructions (e.g., software modules) stored at non-transitory computer readable media that operate on one or more processors. In other embodiments, the systems of optimization model 310 can be implemented in hardware. In further embodiments, the systems of optimization model 310 can be implemented in a combination of hardware and modules of computing instructions stored at non-transitory computer readable media that operate on one or more processors. Optimization model 310 and/or web server 320 each can be a computer system, such as computer system 100 (FIG. 1), as described above, and can be a single computer, a single server, or a cluster or collection of computers or servers, or a cloud of computers or servers. In another embodiment, a single computer system can host optimization model 310 and/or web server 320. In other embodiments, one or more of communication system 311, evaluation system 312, analysis system 313, and/or database system 314 can be implemented separately or in combination with each other, and within or external to optimization model 310 and/or web server 320. Additional details regarding optimization model 310 and the components thereof are described herein.

In many embodiments, user device 340 can comprise graphical user interface ("GUI") 351. In the same or different embodiments, GUI 351 can be part of and/or displayed by user device 340, which also can be part of system 300. In some embodiments, GUI 351 can comprise text and/or graphics (image) based user interfaces. In the same or different embodiments, GUI 351 can comprise a heads up display ("HUD"). When GUI 351 comprises a HUD, GUI 351 can be projected onto a medium (e.g., glass, plastic, etc.), displayed in midair as a hologram, or displayed on a display (e.g., monitor 106 (FIG. 1)). In various embodiments, GUI 351 can be color, black and white, and/or greyscale. In many embodiments, GUI 351 can comprise an application running on a computer system, such as computer system 100 (FIG. 1), user device 340. In the same or different embodiments, GUI 351 can comprise a website accessed through network 330. In these or other embodiments, GUI 351 can comprise an administrative (e.g., back end) GUI allowing an administrator to modify and/or change one or more settings in system 300. In the same or different embodiments, GUI 351 can be displayed as or on a virtual reality (VR) and/or augmented reality (AR) system or display. In some embodiments, an interaction with a GUI can comprise a click, a look, a selection, a grab, a view, a purchase, a bid, a swipe, a pinch, a reverse pinch, etc.

Figure 4:
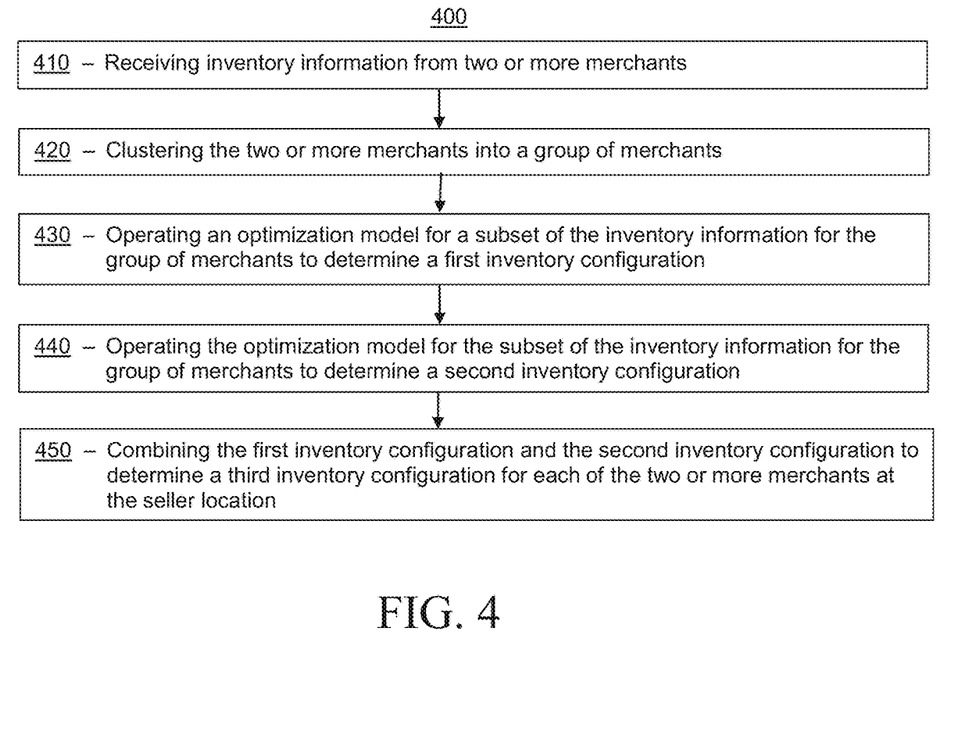
FIG. 4 illustrates a flowchart for a method, according to certain embodiments.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as optimization model 310, web server 320, and/or user device 340 (FIG. 3). The processing module(s) can be similar or identical to the processing module(s) described above with respect to computer system 100 (FIG. 1).

In many embodiments, method 400 can comprise an activity 410 of receiving inventory information from two or more merchants. The merchants can be similar or identical to user 350 (FIG. 3). In some embodiments, the inventory information comprises i) store-item demand information, ii) supplier constraints, and iii) customer choice constraints. The store-item demand information corresponds to one or more items that a store demands. For example, a store may demand 400 medium blue shirts, 500 small red shirts, etc. The store-item demand information can correspond to any type of item that is sold by the store (e.g., clothing, technology, groceries, etc.) The supplier constraints correspond to the constraints provided by the supplier. For example, a supplier of red shirts may have a constraint that only 50 red shirts can be put in a pack of a prepack configurations. In some embodiments, the supplier constraints can include: limits on how much of an item a store can order during a period of time, limits on how often a store can re-order an item during a period of time, limits on which items can be ordered in a particular prepack during a period of time, etc. Customer choice constraints correspond to constraints provided by a customer. For example, the customer can be a merchant or planner. The merchant can provide constraints related to how much of an item is required based on a demand forecast of the merchant's customers (i.e., the end users or end consumers), what type of item is required (e.g., shirts, hats, apples, etc.), what category the item belongs to (e.g., men's pants, women's hats, perishables, etc.), what items can be packed together (e.g., only red shirts in a single pack, only apples in a single pack, etc.).

In many embodiments, method 400 can comprise an activity 420 of clustering two or more merchants into a group of merchants. In some embodiments, the clustering can include clustering two or more merchants into a group of merchants based on clustering criteria for a subset of the inventory information for the group of merchants. In some embodiments, the clustering can include clustering two or more merchants into the group of merchants comprises clustering the two or more merchants based on store-item demand information and geographic information. For example, merchants and/or merchant locations from a particular zip code can be clustered together. These same merchants and/or merchant locations can be further clustered based on what items the merchants demand. For example, the two or more merchants and/or merchant locations can be clustered based on merchants and/or merchant locations that are in zip code A and demand red shirts. In some embodiments, merchants and/or merchant locations with similar demand are clustered into a set of clusters C, where $1 \leq |C| \leq |S|$, where S corresponds to the number of stores.

In many embodiments, method 400 can comprise an activity 430 of operating an optimization model for a subset of the inventory information for the group of merchants to determine a first inventory configuration. For example, the operating can include operating optimization model 310 (FIG. 3). In some embodiments, the operating can include operating the optimization model for the subset of the inventory information for the group of merchants to determine a first inventory configuration for each of the two or more merchants at a seller location. A seller location can correspond to a retail store, a distribution center, a warehouse, etc. In some embodiments, the inventory information can include red shirts, blue shirts, and purple shirts. Here, the subset of the inventory information can correspond to the red shirts. Operating the optimization model on a subset of the inventory information reduces an amount of processing resources. In some embodiments, activity 430 can comprise specifying an optimization model for a subset of the inventory information for the group of merchants to determine a first inventory configuration. For example, specifying the optimization model can include specifying parameters to be utilized in the optimization model.

The optimization model identifies the set of stores (e.g., merchants or merchant locations) by index S, set of pack configurations by B and set of items by I. A pack configuration $b \in B$ is described by the number of items of each type that are packed into it. For example, a first inventory configuration (e.g., pack configuration) can include 50 red shirts and 30 blue shirts. Given demand $D_{i,s}$ for each item $i \in I$ at store $s \in S$, the optimization model determines the following two variables:

1. $y_{b,i}$: pack configurations, number of item $i \in I$ in pack type $b \in B$
2. $x_{s,b}$: number of packs of type $b \in B$ to be sent to each store $s \in S$ Operating the optimization model comprises using the following equations:

$$\text{minimize} \sum_{i \in I} \sum_{s \in S}(o_{i,s} + u_{i,s})p + \lambda 1 \sum_{b \in B} z_b + \lambda 2 \sum_{s \in S} \sum_{b \in B} x_{s,b} \quad (1a)$$

$$\text{subject to} \sum_{b \in B} x_{s,b} y_{b,i} - o_{i,s} + u_{i,s} = D_{i,s} \forall\, i \in I s \in S \quad (1b)$$

$$Lz_b \leq \sum_{i \in I} y_{b,i} \leq Uz_b \,\forall\, b \in B \quad (1c)$$

$$z_{b-1} \geq z_b, \sum_{i \in I} y_{b-1,i} \geq \sum_{i \in I} y_{b,i} \,\forall\, b \in B \quad (1d)$$

$$x \in \mathbb{Z}_{\geq 0}^{|S| \times |B|}, y \in \mathbb{Z}_{\geq 0}^{|B| \times |I|}, o \in \mathbb{R}_{\geq 0}^{|I| \times |S|}, u \in \mathbb{R}_{\geq 0}^{|I| \times |S|}, z \in \{0,1\}^{|B|} \quad (1e)$$

where $u_{i,s}$ is understock of item i at store i and $O_{i,s}$ is overstock of item i at store s; $\lambda_1$ and $\lambda_2$ are penalty parameters; $z_b$ is an indicator variable, with 1 indicating that pack of type b will be used and 0 indicating that it won't; L and U indicate respectively the minimum and maximum number of items that can be packed in a box.

For $\rho=1$, the objective (1a) is the sum of deviations from the target demand $D_{i,s}$ plus penalty for large number of distinct prepacks and total number of packs sent to stores. Constraint (1b) is nonlinear and ensures that the demand for each item i at store s is fulfilled with possible understock or overstock. (1c) captures the supplier box packing constraints. By the structure of the above formulation, an optimal solution will either have $u_{i,s}$ or $O_{i,s}$ greater than 0. Constraints (1d) are symmetry-breaking constraints.

Algorithm (1) is a Mixed Integer Nonlinear Programming (MINLP) problem. To linearize the constraint (1b), embodiments disclosed herein introduce a few additional constraints:

$$x_{s,b} \in \{0,1\} \forall_s \in S, b \in B \quad \text{i.}$$

$$y_{b,i} \leq \max_{s \in S} D_{i,s} \forall b \in B, i \in I \quad \text{ii.}$$

With the additional constrains, embodiments disclosed herein replace $x_{s,b} y_{b,i}$ by $w_{s,b,i}$ and rewrite (1b) as:

$$\Sigma_{b \in B} w_{s,b,i} - O_{i,s} + u_{i,s} = D_{i,s} \forall_i \in I, s \in S \quad 1.$$

$$w_{s,b,i} \leq D_i x_{s,b}, w_{s,b,i} \leq y_{b,i} - (1-x_{s,b}) D_i \forall_s \in S, b \in B, i \in I \quad 2.$$

$$w \in \mathbb{R}_{\geq 0}^{|S| \times |B| \times |I|} \quad 3.$$

The above reformulated problem is a Mixed Integer Linear Programming (MILP) problem, which can be solved using standard solvers such as CPLEX.

To further improve the performance of the optimization model, embodiments disclosed herein cluster stores with similar demand into a set of clusters C, where $1 \leq |C| \leq |S|$. Then, re-frame the store pack allocation problem to determining, $x_{c,b}$: number of packs of type $b \in B$ to be sent to each store s which is part of cluster $c \in C$.

The optimization model utilizes a two phased approach to solve the above problem. In the first phase, the optimization model solves a restricted version of the problem by placing an additional constraint that can pack different sizes of the same color in a box. In the second phase, the optimization model initiates the original MILP problem with the feasible solution from phase 1. Embodiments disclosed herein solve the problem with a no. of distinct prepacks N, limiting the set of pack configurations B to $\{1, 2 \ldots N\}$. Embodiments disclosed herein increase the possible no. of distinct prepacks by 1 until the deviation in fulfilled demand and target demand is less than a threshold.

In some embodiments, operating the optimization model for the subset of the inventory information for the group of merchants to determine the first inventory configuration further comprises: determining understock measurements for each of the two or more merchants based on the inventory information (e.g., $u_{i,s}$); determining overstock measurements for each of the two or more merchants based on the inventory information (e.g., $o_{i,s}$); and summing the understock measurements and the overstock measurements to determine a deviation variable using the first portion of equation 1a (e.g., $\Sigma_{i \in I} \Sigma_{s \in S}(o_{i,s} + u_{i,s})p$).

In some embodiments, operating the optimization model for the subset of the inventory information for the group of merchants to determine the first inventory configuration comprises: determining a number of possible inventory configurations for the two or more merchants. For example, the optimization model will operate on the subset of inventory information (e.g., red shirts) and start with 40 possible inventory configurations for the red shirts. In some embodiments, operating the optimization model for the subset of the inventory information for the group of merchants to determine the first inventory configuration comprises: identifying each of the number of possible inventory configurations with a binary value of 0 or 1. Here, the optimization model will determine which of the 400 possible inventory configurations satisfy a threshold. For example, the optimization model will solve equation 1a for the 400 possible configurations for the red shirts and determine if a fulfillment error exists. If a fulfillment error exists, the configuration will receive a 0. If a fulfillment error does not exist the configuration will receive a 1. In some embodiments, solving the optimization model for the subset of the inventory information for the group of merchants to determine the first inventory configuration comprises: summing each of the number of possible inventory configurations with a binary value of 1 to determine an indicator value. For example, from the 400 possible inventory configurations for the red shirts, 40 may have a binary value of 1. Accordingly, the optimization model will determine the indicator value using a second portion of equation 1a (e.g., $\lambda_1 \Sigma_{b \in B} Z_b$).

In some embodiments, solving the optimization problem for the subset of the inventory information for the group of merchants to determine the first inventory configuration further comprises: identifying how many of the number of possible inventory configurations belong to each of the two or more merchants to determine a store configuration value for each of the two or more merchants. For example, how many of the merchants demand a red shirt. In some embodiments, operating the optimization model for the subset of the inventory information for the group of merchants to determine the first inventory configuration further comprises: summing each of the store configuration values to determine an amount value, wherein the store configuration values are for the seller location. Here, the amount value corresponds to $x_{s,b}$ and the optimization model determines the amount value using a third portion of equation 1a (e.g., $\lambda_2 \Sigma_{s \in S} \Sigma_{b \in B} x_{s,b}$).

In some embodiments, solving the optimization problem for the subset of the inventory information for the group of merchants to determine the first inventory configuration comprises combining the deviation variable, the indicator value, and the amount value to determine a configuration value, and minimizing the configuration value and identifying an output of the minimization as the first inventory configuration using equation 1a.

In many embodiments, method 400 can comprise an activity 440 of operating the optimization model for the subset of the inventory information for the group of merchants to determine a second inventory configuration. In some embodiments, the operating can include solving the optimization problem for the subset of the inventory information the group of merchants to determine the second inventory configuration for each of the two or more merchants at the seller location. Here, the first inventory configuration was for the red shirt. In this example, the second inventory configuration corresponds to the blue shirts.

In some embodiments, solving the optimization problem for the subset of the inventory information for the group of merchants to determine the second inventory configuration comprises: determining a second deviation variable, a second indicator value, and a second amount value for the second inventory configuration, wherein the second deviation value comprises a summation of a second understock measurement and a second overstock measurement, the second indicator value comprises a summation of each of a number of possible inventory configurations with a binary value of 1, and the second amount value comprises a summation of each store configuration values; combining the second deviation value, the second indicator value, and the second amount value to determine a second configuration value; and minimizing the second configuration value and identifying a second output of the minimization of the second configuration value as the second inventory configuration. For example, the optimization model solves equations 1a-1e for the blue shirts in a similar manner as detailed above in connection with activities 410, 420, and 430.

In some embodiments, determining the second inventory configuration comprises comparing the second output of the minimization of the second configuration value to a threshold. For example, the second output is compared to a threshold to determine if a fulfillment error exists. In some embodiments, if a fulfillment error exists, the optimization model increases the number of possible inventory configurations in response to the second output of the minimization of the second configuration value not satisfying the threshold, and re-determines the second deviation value, the second indicator value, and the second amount value for the second inventory configuration in view of the number of possible inventory configurations, as increased. For example, the optimization model analyzes another one of the possible inventory configurations for the blue shirts and solves equations 1a-1e until all the possible configurations for the blue shirts have a binary value of 0 or 1.

In many embodiments, method 400 can comprise an activity 450 of combining the first inventory configuration and the second inventory configuration to determine a third inventory configuration for each of the two or more merchants at the seller location. In some embodiments, activity 450 can comprise combining the first inventory configuration and the second inventory configuration to determine third inventory configuration for each of the two or more merchants at the seller location, wherein the third inventory configuration are more optimal than the first or second inventory configurations. For example, the first inventory configuration can comprise the optimal configurations of red shirts (e.g., the possible configurations that have a binary value of 1) and the second inventory configuration comprises the optimal configurations for blue shirts (e.g., the possible configurations that have a binary value of 1). The first and second inventory configurations can be combined into a third inventory configuration that includes both the optimal red shirt configurations and the optimal blue shirt configurations. That is, the third inventory configuration can comprise a combination of a lowest possible number of inventory configurations for each of the two or more merchants at the seller location. In some embodiments, the optimization algorithm can solve equations 1a-1e using the third inventory configurations. In some embodiments, the third inventory configurations can be utilized to prepare prepacks to send to the two or more merchants.

Returning to FIG. 3, in several embodiments, communication system 311 of the optimization model 310 can at least partially perform activity 410 (FIG. 4).

In several embodiments, evaluation system 312 of the optimization model 310 can at least partially perform activity 420 (FIG. 4).

In a number of embodiments, analysis system 313 of the optimization model 310 can at least partially perform activity 430 (FIG. 4), activity 440 (FIG. 4) and/or activity 450 (FIG. 4).

In a number of embodiments, web server 320 can at least partially perform method 400 (FIG. 4).

As disclosed herein, prepacks are combinations of sizes and colors of an item that are packed together to facilitate easier handling in the supply chain. As the demand for apparel items can vary between different stores, it's a challenge for retailers to accurately fulfil the demand at a store level without creating a large number of prepacks. To reduce the supply chain costs, retailers also want each of the prepacks to be as densely packed as possible. Embodiments herein disclose a prepack optimization to fulfill heterogeneous demand across a network of stores. Embodiments disclosed herein also present a model for determining optimal prepack configurations and allocation to stores. Embodiments disclosed herein formulate a Multi-Objective Mixed Integer Linear Programming (MILP) problem to minimize the error in fulfilment at a store level while determining pack configurations that work across different stores and follow the supplier packing constraints. Embodiments disclosed herein utilize a two phased approach to solve the above problem. In the first phase, embodiments disclosed herein solve a restricted version of the problem by placing an additional constraint that can pack different sizes of same color in a box. In the second phase, embodiments disclosed herein initialize the original MILP problem with the feasible solution from phase 1. Embodiments disclosed herein solve the problem with a no. of distinct prepacks N, limiting the set of pack configurations B to 1, 2, . . . , N. Embodiments disclosed herein increase the possible number of distinct prepacks by 1 until the deviation in fulfilled demand and target demand is less than a threshold.

Embodiments disclosed herein improve upon prior techniques by lowering the number of prepacks that are required for a supplier. For example, table 1 illustrates the output of various experiments and shows that the embodiments disclosed herein produce a deviation below what prior solutions were able to achieve. For example, deviation corresponds to a percentage reduction in number of prepacks. In the illustration of table 1, the no. of prepacks for 352 stores was 14 prepacks, which is 6.9 percent less prepacks than the previous solution.

TABLE 1

| No. Stores | (# Colors; # Sizes) | No. Prepacks | (Understock; Overstock) | Total Demand (units) | Deviation (units) | Deviation (%) |
|---|---|---|---|---|---|---|
| 352 | (4; 6) | 14 | (1055; 11) | 15,478 | 1,066 | 6.9 |
| 633 | (2; 2) | 3 | (514; 169) | 7,195 | 683 | 9.5 |
| 1216 | (3; 5) | 8 | (613; 55) | 20,141 | 668 | 3.3 |
| 3934 | (4; 6) | 24 | (1713; 112) | 678,313 | 1,825 | 0.3 |
| 3943 | (5; 6) | 29 | (3374; 1412) | 653,953 | 4,786 | 0.7 |

Merchants can plan over a network of over 4000 stores across the US. The local demand for various items varies significantly across stores. In particular, in the apparel category the demand for various sizes and colors of the same item is heterogeneous across the stores. Fulfilling this demand typically involves shipping boxes with various combinations of sizes and colors of an item from suppliers to distribution centers and from distribution centers to stores to satisfy local demand. Further, it is desirable to avoid understocking (lost sales) as well overstocking (shelf space constraints) items in the individual stores. Embodiments disclosed herein, provide a practical application and several technological improvements to solve these problems. In some embodiments, the techniques described herein can provide for specifying an optimization model for a subset of inventory information, thereby improving the efficiency of the computing system as all of the inventory information does not need to be processed.

In many embodiments, the techniques described herein can be used continuously at a scale that cannot be reasonably performed using manual techniques or the human mind. For example, processing millions of prepack configurations within milliseconds cannot be feasibly completed by a human.

Although systems and methods for supply chain management have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-4 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system, comprising:
   one or more processors; and
   one or more non-transitory computer-readable media storing instructions that, when executed, cause the one or more processors to:
   cluster two or more merchants into a group of merchants based on clustering criteria;
   identify an optimization model specified for a subset of inventory information for the group of merchants;
   collect, based on the optimization model being specified for the subset of the inventory information, the subset of the inventory information for processing by the optimization model without collecting, for processing by the optimization model, other portions of the inventory information for which the optimization model is not specified for;
   operate the optimization model on the subset of the inventory information to determine a first inventory configuration and to reduce use of computing processing resources and improve computing efficiency relative to operating the optimization model on an entirety of the inventory information, by:
   using, in a first phase, an optimization software package to solve a restricted version of a Multi-Objective Mixed Integer Linear Programming (MILP) problem by placing an additional packing constraint with regards to the subset of the inventory information, wherein the MILP problem reduces error in fulfilment for the group of merchants while (a) determining prepack configurations that work across two or more stores and (b) adhering to supplier constraints,
   using, in a second phase, the optimization software package to initialize an original version of the MILP problem with a solution from the first phase, and continuing to operate the optimization model based on the second phase;
   operate the optimization model for the subset of the inventory information to determine a second inventory configuration;
   combine the first inventory configuration and the second inventory configuration to determine a third inventory configuration, for each of two or more merchants, of the group of merchants, at a seller location, that is more optimal than the first inventory configuration or the second inventory configuration and reduces prepacks required for a supplier relative to not using the third inventory configuration; and
   provide, via a network and to a user device, information based on the third inventory configuration via a website hosted by the system or via an application on the user device.

2. The system of claim 1, wherein the inventory information comprises i) store-item demand information, ii) the supplier constraints, and iii) customer choice constraints.

3. The system of claim 1, wherein one or more instructions, of the instructions, further cause the one or more processors to cluster two or more merchants into the group of merchants based on clustering criteria, store-item demand information, and geographic information.

4. The system of claim 1, wherein one or more instructions, of the instructions, that cause the one or more processors to operate the optimization model to determine the first inventory configuration cause the one or more processors to:
   determine understock measurements for each of the two or more merchants based on the inventory information;
   determine overstock measurements for each of the two or more merchants based on the inventory information; and
   sum the understock measurements and the overstock measurements to determine a deviation variable.

5. The system of claim 4, wherein the one or more instructions that cause the one or more processors to operate the optimization model to determine the first inventory configuration further cause the one or more processors to:
   determine a number of possible inventory configurations for the two or more merchants;
   identify each of the number of possible inventory configurations with a binary value of 0 or I; and
   sum each of the number of possible inventory configurations with a binary value of I to determine an indicator value.

6. The system of claim 5, wherein the one or more instructions that cause the one or more processors to operate the optimization model to determine the first inventory configuration further cause the one or more processors to:
   identify how many of the number of possible inventory configurations belong to each of the two or more merchants to determine store configuration values for the two or more merchants; and
   sum each of the store configuration values to determine an amount value, wherein the store configuration values are for the seller location.

7. The system of claim 6, wherein the one or more instructions that cause the one or more processors to operate the optimization model to determine the first inventory configuration further cause the one or more processors to:
   combine the deviation variable, the indicator value, and the amount value to determine a configuration value; and
   minimize the configuration value and identifying identify an output of the minimization as the first inventory configuration.

8. The system of claim 7, wherein one or more instructions, of the instructions, that cause the one or more processors to operate the optimization to determine the second inventory configuration cause the one or more processors to:
  determine a second deviation value, a second indicator value, and a second amount value for the second inventory configuration,
  wherein the second deviation value comprises a summation of a second understock measurement and a second overstock measurement,
  wherein the second indicator value comprises a summation of each of the number of possible inventory configurations with a binary value of 1, and
  wherein the second amount value comprises a summation of each of the store configuration values;
  combine the second deviation value, the second indicator value, and the second amount value to determine a second configuration value; and
  minimize the second configuration value and identifying a second output of the minimization of the second configuration value as the second inventory configuration.

9. The system of claim 8, wherein one or more instructions, of the instructions, further cause the one or more processors to:
  compare the second output of the minimizing of the second configuration value to a threshold;
  increase the number of possible inventory configurations in response to the second output of the minimizing of the second configuration value not satisfying the threshold; and
  re-determine the second deviation value, the second indicator value, and the second amount value for the second inventory configuration in view of the number of possible inventory configurations, as increased.

10. The system of claim 1, wherein the third inventory configuration comprises a combination of a lowest possible number of inventory configurations for each of the two or more merchants at the seller location.

11. The system of claim 1,
  wherein the first phase includes using a constraint that allows packing of a plurality of sizes of one or more items of a same color in a same prepack, and
  wherein the second phase includes solving the MILP problem by (1) limiting a first number of distinct prepacks to a first predetermined value, (2) limiting a second number of the prepack configurations to a second predetermined value, and (3) gradually increasing the first number of distinct prepacks until a deviation between a fulfilled demand and a target demand is below a predetermined threshold.

12. A method, the method comprising:
  clustering, by one or more computer systems, two or more merchants into a group of merchants based on clustering criteria;
  operating, by the one or more computer systems, based on an optimization model being specified for a subset of inventory information for the group of merchants, and to determine a first inventory configuration, the optimization model on the subset of the inventory information without collecting, for being operated on by the optimization model, other portions of the inventory information for which the optimization model is not specified for and by using one or more versions of a Multi-Objective Mixed Integer Linear Programming (MILP) problem in a first phase and a second phase to reduce error in fulfilment to the group of merchants while (a) determining prepack configurations that work across the group of merchants and (b) adhering to supplier constraints;
  determining, by the one or more computer systems, a second inventory configuration;
  determining, based on the first inventory configuration and the second inventory configuration, a third inventory configuration to reduce prepacks required for a supplier relative to not using the third inventory configuration; and
  providing, by the one or more computer systems, information based on the third inventory configuration via a website hosted by the one or more computer systems or via an application.

13. The method of claim 12, wherein the third inventory configuration comprises a combination of a lowest possible number of inventory configurations for each of two or more merchants at a seller location.

14. The method of claim 12,
  wherein the first phase includes using a constraint that allows packing of a plurality of sizes of one or more items of a same color in a same prepack; and
  wherein the second phase includes solving the MILP problem by (1) limiting a first number of distinct prepacks to a first predetermined value, (2) limiting a second number of the prepack configurations to a second predetermined value, and (3) gradually increasing the first number of distinct prepacks until a deviation between a fulfilled demand and a target demand is below a predetermined threshold.

15. The method of claim 12, wherein operating the optimization model to determine the first inventory configuration comprises:
  determining a number of possible inventory configurations for two or more merchants of the group of merchants;
  identifying each of the number of possible inventory configurations with a binary value of 0 or 1; and
  summing each of the number of possible inventory configurations with a binary value of 1 to determine an indicator value.

16. The method of claim 15, wherein operating the optimization model to determine the first inventory configuration further comprises:
  identifying how many of the number of possible inventory configurations belong to each of the two or more merchants to determine store configuration values for the two or more merchants; and
  summing each of the store configuration values to determine an amount value.

17. The method of claim 16, operating the optimization model to determine the first inventory configuration further comprises:
  combining a deviation variable, the indicator value, and the amount value to determine a configuration value; and
  minimizing the configuration value and identifying an output of the minimization as the first inventory configuration.

18. The method of claim 17, wherein determining the second inventory configuration comprises:
  determining a second deviation value, a second indicator value, and a second amount value for the second inventory configuration,
  wherein the second deviation value comprises a summation of a second understock measurement and a second overstock measurement, wherein the second indicator value comprises a summation of each of the number of possible inventory configurations with a binary value of 1, and wherein the second amount value comprises a summation of each of the store configuration values;

combining the second deviation value, the second indicator value, and the second amount value to determine a second configuration value; and minimizing the second configuration value and identifying a second output of the minimization of the second configuration value as the second inventory configuration.

19. The method of claim 18, further comprising:

comparing the second output of the minimizing of the second configuration value to a threshold;

increasing the number of possible inventory configurations in response to the second output of the minimizing of the second configuration value not satisfying the threshold; and re-determining the second deviation value, the second indicator value, and the second amount value for the second inventory configuration in view of the number of possible inventory configurations, as increased.

20. A non-transitory computer-readable medium storing computing instructions that, when executed on a processor, cause the processor to:

cluster two or more merchants into a group of merchants based on clustering criteria;

process, based on an optimization model being specified for a subset of inventory information for the group of merchants, the subset of the inventory information using the optimization model to determine a first inventory configuration and by collecting, for processing using the optimization model, only the subset of the inventory information, wherein the inventory information includes the subset of the inventory information and one or more other subsets of the inventory information, and wherein the optimization model is configured to utilize one or more versions of a Multi-Objective Mixed Integer Linear Programming (MILP) problem in a first phase and a second phase;

determine a second inventory configuration;

combine the first inventory configuration and the second inventory configuration to determine a third inventory configuration for preparing prepacks for the two or more merchants, wherein the third inventory configuration is more optimal than the first inventory configuration or the second inventory configuration; and provide information based on the third inventory configuration.

* * * * *